United States Patent [19]

McConkey

[11] Patent Number: 5,076,123
[45] Date of Patent: Dec. 31, 1991

[54] SINGLE SPINDLE DRIVE ASSEMBLY

[75] Inventor: James W. McConkey, Delta, Ohio

[73] Assignee: Brittani-7, Inc., Delta, Ohio

[21] Appl. No.: 549,287

[22] Filed: Jul. 6, 1990

[51] Int. Cl.⁵ ............................................. B23B 19/02
[52] U.S. Cl. ........................................... 82/142; 29/53; 408/43
[58] Field of Search ................. 82/131, 143, 142, 152; 408/43, 53, 124; 29/50, 51, 53, 27 A

[56] References Cited

U.S. PATENT DOCUMENTS

| | | | |
|---|---|---|---|
| 1,685,319 | 9/1928 | Erdman | 29/51 |
| 3,794,436 | 2/1974 | Rowlett | 408/124 |

FOREIGN PATENT DOCUMENTS

| | | | |
|---|---|---|---|
| 895512 | 1/1945 | France | 408/43 |
| 906344 | 12/1945 | France | 408/43 |
| 44245 | 3/1985 | Japan | 408/124 |
| 292343 | 12/1987 | Japan | 408/53 |
| 176995 | 5/1935 | Switzerland | 408/124 |

*Primary Examiner*—Daniel W. Howell
*Attorney, Agent, or Firm*—Harness, Dickey & Pierce

[57] ABSTRACT

A single spindle drive apparatus for a conventional single or multiple spindle machine derives power directly from the main machine drive and provides increased operating speed. The drive apparatus includes at least one pair of speed change gears and a splined input shaft engaged by a complemental internally splined gear which is driven by the main idler drive gear on the machine. A chuck or collect or other tool holding device may be coupled to the output shaft. Tool speeds can readily be increased for between 2 and 5 times the machine drive speed. The apparatus includes mounting components which facilitate mounting upon the end tool slide of the machine.

19 Claims, 4 Drawing Sheets

SINGLE SPINDLE DRIVE ASSEMBLY

BACKGROUND OF THE INVENTION

This invention relates generally to auxiliary apparatus for single and multiple spindle machines and more specifically to an apparatus for increasing the speed of a single spindle of a single or multiple spindle machine which is driven directly by the machine and mounts to the tool slide.

Lathes, automatic screw machines and multiple spindle machines comprise the fundamental production means for parts which may be characterized as having axial symmetry. For example, shafts, flanges, collars, bushings, bearings, screws, bolts, fasteners, fittings and innumerable other machine and structural components are so fabricated. Given the pervasive nature of both the machine and the components thereon fabricated, much attention and effort has been directed not only to the design, configuration and function of the basic machines, but also to modifications of such machines and attachments therefor.

Such a lathe attachment is disclosed in U.S. Pat. No. 332,817. This attachment is intended to increase the size of the workpiece which may be mounted upon a lathe and includes an enlarged face plate which is supported for rotation upon a demountable base and a speed reducing drive which derives power from the existing lathe. While the faceplate thus turns slower than the original design speed, it accepts a significantly larger work piece than accommodated by the basic lathe.

An attachment intended to facilitate milling or turning and to increase the swing of a lathe is disclosed in U.S. Pat. No. 1,028,728. The lathe attachment mounts to the lathe bed and includes a frame supporting a plurality of interengaging gears. The input and output shafts of the gearing include beveled gears which mate with complemental beveled gears disposed upon and coupled to splined shafts. Accordingly, the positions of the input and output shafts along the splined shafts may be adjusted. Consequently, the maximum size of workpieces accepted by the lathe can be increased for various milling and turning processes.

U.S. Pat. No. 1,054,387 teaches yet another attachment for lathes wherein an oversized work piece may be received within a hollow gear. The hollow gear is driven through an offset shaft by a drive gear on the spindle. A cutting tool disposed upon and rotated with the hollow gear engages the surface of the workpiece, rotating about it and turning and truing it.

In U.S. Pat. No. 1,311,454, a supplementary high speed lathe spindle is disclosed. The device is straightforward and includes a bearing member and stub shaft which are mounted upon and secured to the headstock spindle of the lathe. A cone pulley and supplemental nose piece supported for rotation on the stub shaft are driven by independent power means and may rotate at speeds higher or, presumably, lower, than the normal lathe speed. Since the lead screw is driven by the internal lathe drive, the ratio of spindle revolutions relative to tool feed travel may be raised significantly and adjusted independently.

In U.S. Pat. No. 3,555,963 a machine is illustrated which includes a removable multi-tool head. A conveyor or transfer mechanism provides and removes both workpieces and multiple tool holding heads. Production increases are offered by this machine which can rapidly exchange tool heads containing several tools.

A spindle machine having plural interchangeable gear boxes is disclosed in U.S. Pat. No. 3,794,436. This machine utilizes a plurality of interchangeable gear boxes which are driven by a single drive gear and which each include a plurality of output shaft spindles. The spindles may be driven by different gear train configurations to provide different takeoff speeds. The takeoffs are connected through universal drive assemblies to conventional spindles.

A friction controlled tool holder for lathes is disclosed in U.S. Pat. No. 3,840,928. This device includes a stub shaft for mounting in the spindle of a lathe and a pinion gear clutching arrangement which is surrounded by a manually engageable cylindrical sleeve. When rotation of the sleeve is manually retarded, power is transferred to a tapping or other cutting tool and the tool performs a cutting operation. When the sleeve is released, the cutting action ceases.

Finally, U.S. Pat. No. 4,722,123 teaches a dual speed drive system for lathes. An electric motor is coupled to and rotates the workpiece and provides power to a hydraulic pump. The pump is preferably a variable volume type and its output flow is coupled to a hydraulic motor which drives the tool. Hence, the speed of the tool may be adjusted independently of the speed of the electric motor and thus of the workpiece to provide a wide range of relative tool and workpiece speeds.

The foregoing survey of lathe and spindle machine attachments is representative of the various features, adaptations and goals relating to modifications of such machines. However, it is also apparent that further improvements directed toward spindle drive systems and consequent productivity increases are both possible and desirable.

SUMMARY OF THE INVENTION

A single spindle drive apparatus for a conventional single or multiple spindle machine derives power directly from the machine and provides increased operating speed. The drive apparatus includes at least one pair of speed change gears and a splined input shaft adapted to being engaged by a complemental internally splined pinion gear driven by the machine. A chuck, collet or other tool holder may be coupled to the output shaft. The apparatus includes fasteners and guides which facilitate mounting on the end tool slide channels of the machine. The number of gear pairs and the individual and thus overall gear ratios may be varied over a wide range to provide widely varying tool drive speeds. Several spindle drive apparatus according to the present invention may be utilized on one multiple spindle machine at the same time.

DESCRIPTION OF THE PREFERRED EMBODIMENT

Figure 1:
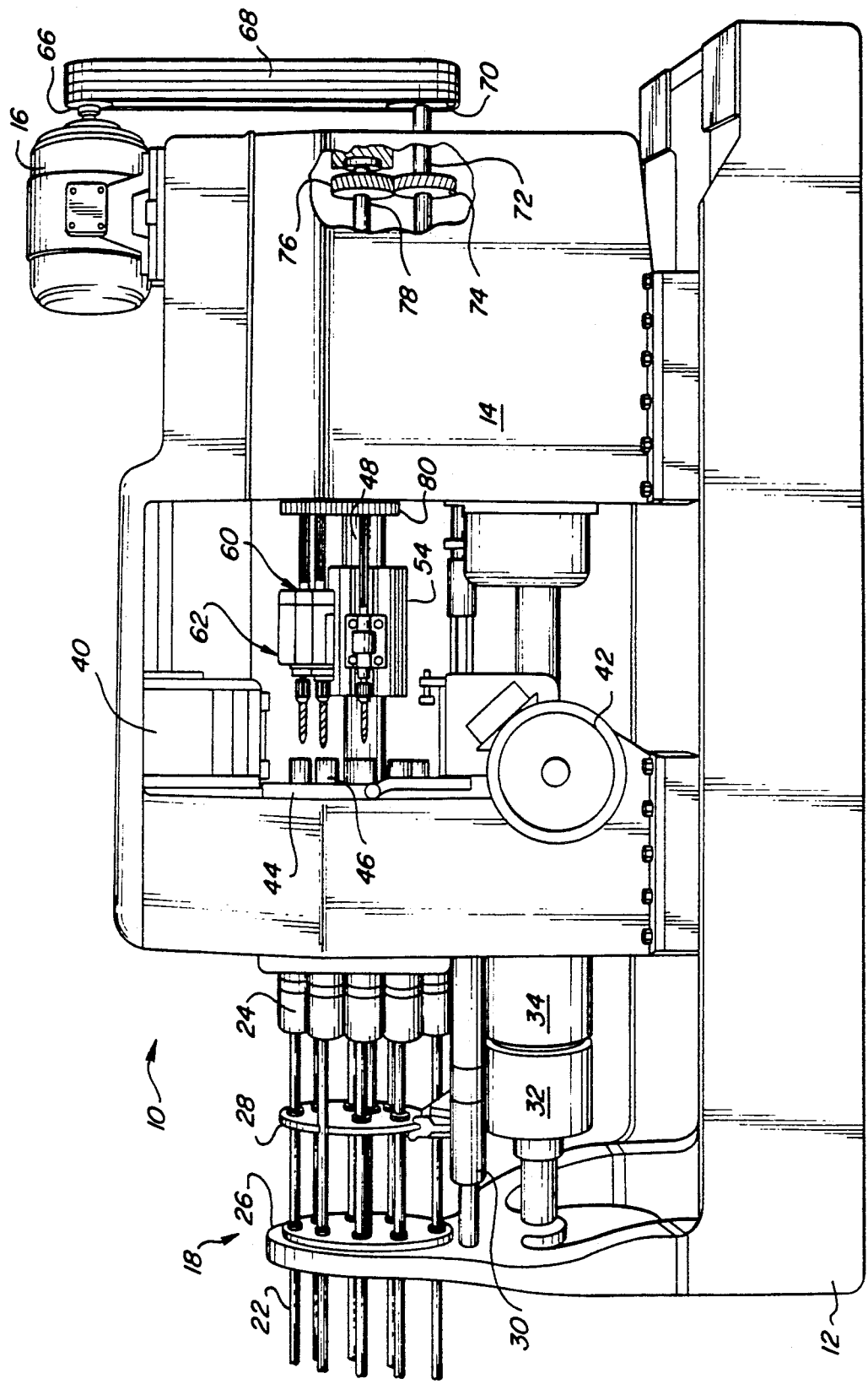
FIG. 1 is a front elevation of a multiple spindle machine incorporating a pair of spindle drive assemblies according to the present invention.
Figure 2:
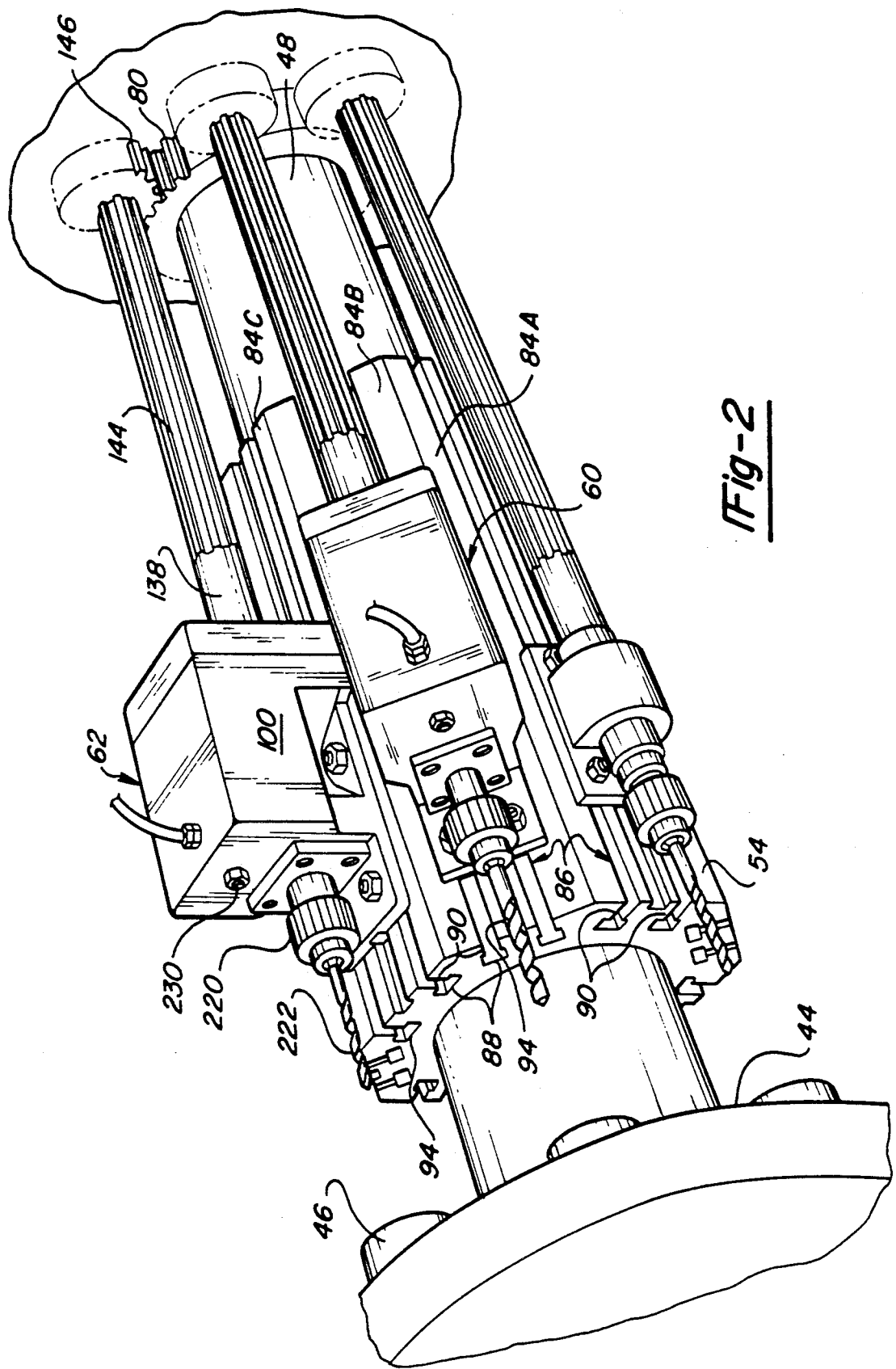
FIG. 2 is an enlarged perspective view of a pair of spindle drive assemblies according to the present invention mounted upon an end tool slide of a multiple spindle machine.

Referring now to FIGS. 1 and 2, a multiple spindle automatic bar machine incorporating the present invention is illustrated and generally designated by the reference numeral 10. The machine 10 may be one of a number of machines similar in design and function to those manufactured by the National Acme Company of Cleveland, Ohio and sold under the name Acme-Gridley. The machine 10 illustrated includes eight spindles. Alternatively, such machines may include one, four or six spindles. It will be understood that the machine 10 illustrated in FIG. 1 appears for purposes of illustration and example as a typical single or multiple spindle machine. The invention described herein is adaptable to and functions with virtually all single and multiple spindle machines. Accordingly, its application is not and should not be construed to be limited to the multiple spindle machine 10 illustrated.

The multiple spindle machine 10 includes an elongate, generally horizontal base 12 which supports a machine frame 14. The machine frame 14 houses and supports various mechanisms and components of the machine 10 including, for example, a main drive motor 16 and a stock feeding and indexing assembly 18. The stock feeding and indexing assembly 18 is conventional and includes a plurality of stock reel tubes 22 and finger holder mechanisms 24. One of the stock reel tubes 22 and one of the finger holder mechanisms 24 are associated with each of the spindles of the machine 10. The stock feeding and indexing assembly 18 also includes an indexing stock rail 26, a stock feeding ring and aligning disc 28, a stock feeding slide 30, a stock feeding drum 32 and a chucking drum 34.

Generally centrally mounted within the machine frame 14 is an upper cross slide drum 40 and a lower cross slide drum 42. Disposed generally intermediate these components is a spindle carrier 44 which is rotatable and which rotatably supports a plurality of work spindles 46. The work spindles 46 receive and retain the bar stock which is being machined, as will be readily appreciated. The spindle carrier 44 rotates about an axis defined by a spindle carrier stem 48. A non-rotating end tool slide 54 is disposed coaxially upon the spindle carrier stem 48. In use, various assemblies for carrying out the desired functions of the machine 10 such as drilling, boring, counterboring, reaming, turning, chamfering, tapping, threading and facing are secured to the end tool slide 54. In FIG. 1, a drilling attachment 56 is secured to the end tool slide 54 as are a first drive assembly 60 and a second drive assembly 62. Typically, additional machining assemblies (not illustrated) will be secured to the end tool slide 54 in other positions.

Rotary power is supplied to the attachment 56 and the drive assemblies 60 and 62 from the main drive motor 16 which includes a drive pulley 66 on its output shaft. The drive pulley 66 drives a plurality of V-belts 68 which engage a driven pulley 70. The driven pulley 70 is secured to a shaft 72 having a first spur gear 74 which mates with a second spur gear 76. The second spur gear 76 is disposed upon a suitably mounted rotatable drive shaft 78. The drive shaft 78 is coupled either directly or through suitable gearing (not illustrated) to a main idler gear 80 which is disposed coaxially about the axis of the spindle carrier stem 48.

As illustrated in FIG. 2, the end tool slide 54 generally defines a square, hexagonal or octagonal, axially extending structure depending on whether the machine has four, six, or eight spindles, respectively. The end tool slide 54 illustrated in FIG. 2 is octagonal inasmuch as the machine 10 is an eight spindle machine as noted above. As such, it includes eight generally planar interrupted surfaces, those which are visible in FIG. 2 being labeled 84A, 84B and 84C. The plane of each of the surfaces 84A, 84B and 84C is normal to a line of radius extending from the spindle carrier stem 48 at the center of the surface. Each of the planar, axially extending surfaces 84A, 84B and 84C is interrupted by a pair of spaced-apart T-shaped slots 86 which define an enlarged base region 88 and a narrow throat region 90. The T-shaped slots 86 extend axially the full length of the end tool slide 54 and facilitate mounting, adjustment and removal of a variety of machining assemblies to the end tool slide 54 as will be explained in greater detail below. Medially disposed between the pair of spaced-apart T-shaped slots 86 is a channel 94 which also extends axially and is thus disposed parallel to the slots 86. The channel 94 cooperates with the T-shaped slots 86 to mount a machining assembly to the end tool slide 54.

Figure 3:
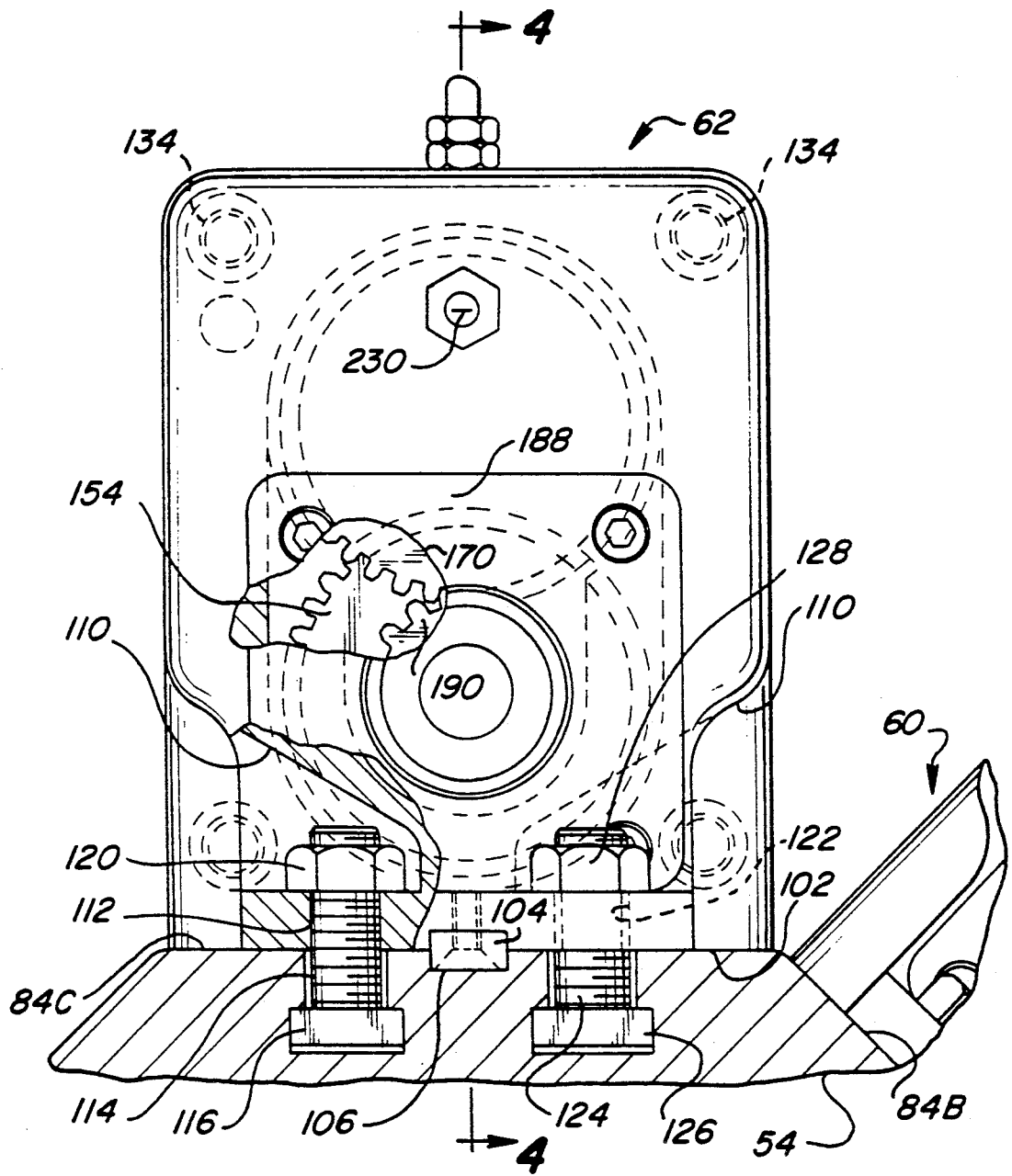
FIG. 3 is an end, elevational view with portions broken away of a spindle drive assembly according to the present invention in place upon an end tool slide of a multiple spindle machine.

Turning now to FIG. 3, the mounting arrangement for demountably and adjustably securing a drive assembly 62 according to the present invention upon an end tool slide 54 in a multiple spindle machine 10 is illustrated. The drive assembly 62 includes a housing 100 having a width preferably slightly narrower than the width of an individual surface such as the surface 84C of the end tool spindle 54. The housing 100 has a lower surface 102 which is generally planar, being interrupted only by a medial, axially extending web or bar 104. The bar 104 is secured within a complemental slot in the housing 100 by suitable threaded fasteners 106. The bar 104 is tightly, though slidably received in the channel 94 and thus accurately positions the assembly 62 circumferentially and angularly while permitting translation of the assembly 62 along an axis parallel to the axis of the spindle carrier stem 48.

The housing 100 also defines a pair of opposed reentrant regions 110. Extending into each of the reentrant regions 110 through suitably sized through apertures 112 are a pair of threaded machine screw 114. The machine screws 114 each include square, hexagonal or otherwise flatted heads 116 having a distance between flats which is preferably slightly less than the width of the enlarged base regions 88 of the T-shaped slots 86. The flatted heads 116 are thus held in the base regions 88 of the T-shaped slots 86, thereby inhibiting rotation of the machine screws 114. Each of the machine screws 114 includes a complementally threaded nut 120.

The housing 100 also defines a second pair of apertures 122 through which extend an additional pair of threaded machine screws 124 having flatted heads 126 and complemental nuts 128. The nuts 120 and 128 on the fasteners 114 and 124 may be loosened to permit translation of the assembly 62 along the axis defined by the T-shaped slots 86 and the channel 94 as well as removal of the assembly 62 from the end tool slide 54, if desired. Tightening of the nuts 120 and 128 on the threaded fasteners 114 and 124 secures the assembly 62 in a desired position along the end tool slide 54, as will be readily appreciated.

Figure 4:
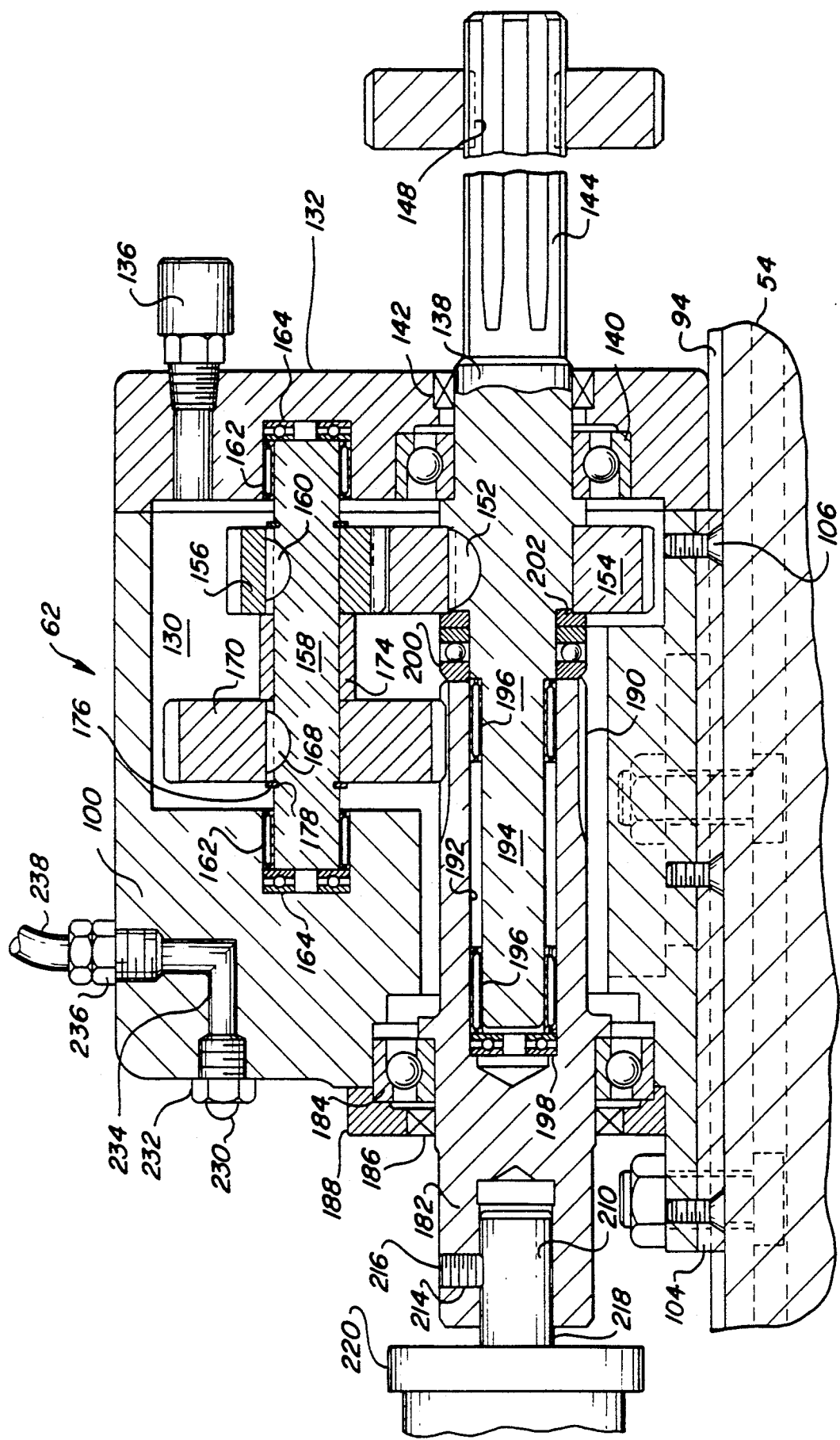
FIG. 4 is a full, sectional view of a spindle drive assembly according to the present invention taken along line 4—4 of FIG. 3.

Referring now to FIG. 4, the drive assembly 62 is illustrated. As will be readily appreciated, the housing 100 includes a cavity 130 which receives various drive components of the assembly 62 and which is closed and sealed by a suitably configured end cap 132. The cavity 130 is preferably substantially filled with a suitable gear lubricant. The end cap 132 is removably secured to the housing 100 by a plurality of threaded cap screws 134 illustrated in FIG. 3. The end cap 132 receives and supports a conventional breather vent 136.

An input shaft 138 is received with the housing 100 and supported by an anti-friction bearing such as the ball bearing 140 mounted in the end cap 132. An elastomeric seal 142, also mounted in the end cap 132 maintains lubricant within the cavity 130 of the housing 100 and excludes contaminants and other foreign material therefrom. The input shaft 138 includes male splines 144 extending substantially along its full length. Adjacent the terminus of the portion of the input shaft 138 including the male splines 144 is a pinion drive gear 146 defining a concentric through aperture having complemental female splines 148. The pinion drive gear 146 rotationally engages the gear 80 and drives the input shaft 13 which provides rotating power to the assembly 62 derived directly from the main drive motor 16 of the machine 10.

Keyed to the input shaft 138 by a Woodruff key 152 or similar key structure is a first pinion gear 154. In the preferred embodiment, the first pinion gear 154 has thirty-seven teeth and a diametral pitch of 20. The first pinion gear 154 engages a second pinion gear 156 secured to a stub idler shaft 158 by a Woodruff or similar key 160. The second pinion gear 156 has twenty teeth and a diametral pitch of twenty. The stub idler shaft 158 is supported by a pair of anti-friction bearings such as roller bearings 162 and an opposed pair of thrust bearings 164. One each of the pair of roller bearings 162 and thrust bearings 164 are disposed within the housing 100 and the other of each of the pairs is disposed within the end cap 132.

Also keyed to the stub idler shaft 158 by a Woodruff or similar key 168 is a third pinion gear 170. The third pinion gear 170 includes thirty-seven teeth and has a diametral pitch of twenty. Spacing between the second pinion gear 156 and the third pinion gear 170 is maintained by a sleeve or spacer 174 disposed about the stub idler shaft 158. A pair of retainer rings 176 which seat within suitably configured grooves 178 in the idler shaft 158 maintain the pinion gears 156 and 170 in their proper axial positions on the idler shaft 158 as will be appreciated.

Extending from within the cavity 130 to the exterior of the housing 100 is an output shaft 182. The output shaft is supported in the housing 100 by an anti-friction bearing such as the ball bearing 184. An elastomeric seal 186 adjacent the ball bearing 184 maintains lubricant within the cavity 130 and excludes contaminants and foreign material therefrom. The ball bearing 184 is retained by and the elastomeric seal 186 is supported by a square mounting plate 188 secured to the housing 100 by suitable threaded fasteners.

The output shaft 182 defines a fourth pinion gear 190. The pinion gear 190 includes twenty teeth and has a diametral pitch of twenty. The fourth pinion gear 190 is driven by and meshes with the third pinion gear 170. The output shaft 182 is partially hollow and defines a concentric blind, i.e. re-entrant, passageway 192. The blind passageway 192 receives a stub extension 194 of the input shaft 138. The stub extension 194 is centered within the passageway and is supported by a pair of spaced-apart anti-friction bearings such as roller bearings 196.

A thrust bearing 198 is disposed between the end of the stub extension 194 and the end of the blind passageway 192. A thrust bearing 200 is positioned between the end of the output shaft 182 adjacent the fourth pinion gear 190 and a spacer 202 disposed adjacent the first pinion gear 154. The end of the output shaft 182 extending outside the housing 100 includes a concentric, re-entrant passageway 210 having an intersecting radially oriented threaded passageway 214. The threaded passageway 214 receives a complementally threaded set screw 216 which selectively secures the shaft 218 of a drilling or machining component such as a colletor chuck 220. The chuck 220 is, of course, adapted to receive a countersink, drill bit 222 or other machining tool. Hence, a section of material such as bar stock retained in the spindle 46 may be machined by the drill 222 or other tool driven by the drive assembly 62.

The drive assembly 62 also includes components for providing cutting fluid to the drill bit 222 or other machining tool. An adjustable nozzle 230 is retained with a threaded locking collar 232 which is received within a suitably threaded passageway 234 in the housing 100. The locking collar 232 may thus be loosened and the nozzle 230 adjusted to direct a stream of lubricant to the tip of the drill bit 222 or as otherwise needed. The lubricant passageway 234 extends from the nozzle 230 to a fitting 236 which is also threadably received within the housing 100. The fitting 236 couples and securely retains a flexible lubricant hose 238 to the housing 100. The lubricant hose 238 is coupled to a source at lubricant or cutting fluid (not illustrated). It will thus be appreciated that pressurized cutting fluid or lubricant may be supplied through the lubricant hose 23 to the nozzle 230 and thence to the drill bit 222 or other machining tool.

In a typical installation, the input shaft 138 will be driven by the gear 80 of the machine 10 at a speed of 1,500 R.P.M. With a gear ratio of 1.85 between the first pinion gear 154 and the second pinion gear 156, that is, thirty-seven teeth to twenty teeth, the stub idler shaft 158 will rotate at 2,775 R.P.M. In turn, a gear ratio of 1.85 between the third pinion gear 170 and the fourth pinion gear 170, that is, thirty-seven teeth to twenty teeth, the output shaft 182 will rotate at 5,130 R.P.M. Thus, the drive assembly 62 illustrated provides an overall increased speed ratio of 3.42.

It will be understood that the drive assembly 62 is readily adjustable through the selection and utilization of other pinion gears to provide other through drive ratios as desired. Typically, through drive ratios in the range of from 2.00 or less to 5.00 and greater are suitable for most applications. It should also be appreciated that drive assemblies having different gear and drive ratios may be used cooperatively on one machine to provide optimum tool speeds for diverse machining processes. For example, in the machine 10, illustrated, the drive assembly 60 may exhibit a drive ratio of 4.55, whereas the drive assembly 62 may exhibit a drive ratio of 2.38.

In operation, the drive assembly 62 is mounted to the end tool slide 54 by alignment of the bar 104 in the channel 94, proper positioning of the assembly 62 on the end tool slide 54 and tightening of the nuts 120 and 128. As noted previously, the auxiliary drive assembly 62 derives power directly from the main drive motor 16 through the gear 80 and thus does not require the use of auxiliary pneumatic, electric or hydraulic power sources. This feature greatly simplifies the installation of and enhances the utility of the drive assembly 62.

It will be appreciated that because the drill 222 or other tool in the drive assembly 62 rotates at a significantly higher speed, the overall production rate of the machine 10 may be increased by reducing the time expended on the slowest step or steps. For example, if at a certain position, a large or deep aperture must be drilled, whereas other machine positions perform relatively limited and rapid machining steps, the slow step sets the timing and production rate for the entire machine Through the use of the drive assembly 62, the time required for the slowest, most time consuming step can be greatly reduced, thereby permitting an overall increase in the production speed of the machine 10

It will thus be appreciated that the drive assembly 62 may be utilized to provide greatly increased drill and other machining tool rotational speeds which are far higher than those available on conventional multiple spindle machines. Given appropriate drive speeds and gear ratio combinations, such drill or machining speeds can exceed 10,000 R.P.M. The drive assembly 62 according to the present invention also permits deep hole drilling in a workpiece that conventional live spindle drilling cannot accomplish. Also, because of the increased rotational speed and capability, it is often possible to combine tooling stations on the end tool slide such that additional machining components and thus machining operations may be accomplished on a given multiple spindle machine. A related advantage is that some secondary operations can be combined or eliminated by virtue of the capabilities of the drive assembly 62, again permitting increased production speeds and the elimination of certain tooling stations.

The foregoing disclosure is the best mode devised by the inventor for practicing this invention. It is apparent, however, that apparatus incorporating modifications and variations will be obvious to one skilled in the art of machine tools and equipment. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. In an auxiliary device for a spindle machine having at least one spindle, a drive motor coupled to a main idler gear disposed in axial alignment with an end tool slide having channels, the improvement comprising, in combination, a housing, means for mounting said housing on said end tool slide including a rib complemental to one of said channels, an input shaft having splines and a complementally splined input gear disposed on said input shaft and driven by said main idler gear, an output shaft extending from said housing having means for receiving a machining component, and a speed change means in said housing coupling said input shaft to said output shaft for driving said output shaft at a rotational speed distinct from said rotational speed of said input shaft.

2. The improvement of claim 1 wherein said output shaft includes a concentrically disposed re-entrant bore which receives a portion of said input shaft.

3. The improvement of claim 2 further including anti-friction roller bearings disposed between said portion of said input shaft received within said output shaft and said output shaft.

4. The improvement of claim 1 further including means disposed adjacent said output shaft for providing cutting fluid to the vicinity of a cutting tool.

5. The improvement of claim 1 wherein said input shaft and said output shaft are supported in said housing by anti-friction bearings.

6. The improvement of claim 1 wherein said speed change means includes a plurality of coupled gears and said output shaft rotates at a higher speed than said input shaft.

7. The improvement of claim 1 wherein said housing includes a plurality of apertures generally adjacent said rib for receiving fasteners and a like plurality of fasteners having heads for disposition in said channels of said end tool slide.

8. The improvement of claim 1 wherein the ratio of said speed change means is between about 2.00 to about 5.00.

9. A spindle drive assembly for operation with a single or multiple spindle machine comprising, in combination, a housing, means for securing said housing to a tool slide of a spindle machine, an input shaft extending into said housing, said input shaft having splines, an output shaft extending from said housing and defining an end adapted for receiving a tool holding component, and speed change means in said housing for coupling said input shaft and shaft output shaft.

10. The spindle drive assembly of claim 9 wherein said securing means includes a web projecting from one face of said housing for cooperating with a channel of an end tool slide, a plurality of openings extending through said face and a plurality of fasteners disposed in said openings, said fasteners having heads cooperating with T-shaped channels in said end tool slide.

11. The spindle drive assembly of claim 9 further including a pinion gear having internal splines complemental to said splines on said input said for engagement with a drive gear of a spindle machine.

12. The spindle drive assembly of claim 9 further including an idler shaft disposed in said housing in spaced relation to said input shaft and said output shaft, a first pair of speed change gears coupling said input shaft and said idler shaft and a second pair of speed change gears coupling said idler shaft and said output shaft.

13. The spindle drive assembly of claim 12 wherein the ratio of each of said pairs of speed change gears is between about 1.00 and 2.50.

14. The spindle drive assembly of claim 9 wherein said output shaft includes a concentrically disposed re-entrant portion receiving a portion of said input shaft.

15. The spindle drive assembly of claim 14 further including roller bearings disposed between said portion of said input shaft received within said output shaft.

16. The spindle drive assembly of claim 9 further including a nozzle mounted upon said housing and means for supplying said nozzle with cutting lubricant.

17. A spindle drive assembly for operation with a single or multiple spindle machine comprising, in combination, a housing, means for securing said housing to a tool slide of a spindle machine, said means including a web and fasteners adapted to be received in channels in a spindle machine tool slide, an input shaft extending into said housing, said input shaft having splines, a gear received on said input shaft splines and adapted for driving by a spindle machine gear, an output shaft extending from said housing and defining an end adapted for receiving a tool holding component, and speed change gearing in said housing coupling said input shaft and shaft output shaft, said gearing having a ratio between about 2.00 and 5.00.

18. The spindle drive assembly of claim 17 wherein said output shaft includes a concentrically disposed re-entrant portion receiving a portion of said input shaft and further including roller bearings disposed between said portion of said input shaft received within said output shaft.

19. The spindle drive assembly of claim 17 further including a nozzle mounted upon said housing and means for supplying said nozzle with cutting lubricant.

* * * * *